United States Patent

Chen

[15] 3,644,165
[45] Feb. 22, 1972

[54] FIBER REINFORCED LAMINATED PLASTIC FILM AND METHOD OF MAKING SAME

[72] Inventor: Wei-Gwo Chen, Houston, Tex.
[73] Assignee: Griffolyn Company, Incorporated
[22] Filed: Oct. 15, 1969
[21] Appl. No.: 866,599

[52] U.S. Cl. ................161/58, 156/177, 156/179, 156/439, 161/143, 161/144
[51] Int. Cl. .................................................B32b 5/08
[58] Field of Search ........156/177, 179; 161/55, 57, 58, 161/59, 78, 109, 113, 142, 143, 144

[56] References Cited

UNITED STATES PATENTS

| | | | |
|---|---|---|---|
| 3,546,057 | 12/1970 | Jenkins | 161/144 X |
| 1,460,949 | 7/1923 | Currier | 156/177 X |
| 1,571,579 | 2/1926 | Duryea | 161/59 |
| 2,125,583 | 8/1938 | Reed | 161/143 X |
| 2,313,581 | 3/1943 | Reed | 161/143 |
| 2,851,389 | 9/1958 | Lappala | 161/139 X |
| 2,999,041 | 9/1961 | Lappala | 161/144 X |
| 3,314,841 | 4/1967 | Romanin | 161/143 X |
| 3,445,319 | 5/1969 | Dawbarn | 161/59 X |
| 3,511,739 | 5/1970 | Hebberling | 161/57 |

Primary Examiner—Robert F. Burnett
Assistant Examiner—Raymond O. Linker, Jr.
Attorney—Johan Bjorksten

[57] ABSTRACT

An improved fiber reinforced laminate, in which the nonwoven reinforcement is oriented in four different planes, each of the four containing fibers parallel with each other. Describing the construction in another way, it consists essentially of two diamond patterns superimposed on each other, one of which has its longer diagonals parallel with the longitudinal direction of the laminate (the machine direction), and the other has its shorter diagonal parallel with this direction. The invention also contemplates a method for mass producing this laminated article, by means of modulating the speed of the fiber angularizing means of the laminate producing machine.

10 Claims, 6 Drawing Figures

PATENTED FEB 22 1972 3,644,165

FIBER REINFORCED LAMINATED PLASTIC FILM AND METHOD OF MAKING SAME

This invention relates to flexible foldable laminates which are reinforced by means of diamond patterned nonwoven fiber structures, and in which the reinforcing fibers between any two film surfaces lie in at least four different planes, and are parallel within these planes. In referring to four planes, I have particular reference to those points where all of the fibers cross over each other, due to the sagging between crossover points the fibers may bend into the same under influence of pressure, but if through tension or otherwise the fibers are rigidized, they will be structurally in four different planes.

Heretofore, reinforced plastics are well known, and diamond structure has been disclosed, for example, in U.S. Pat. Nos. 2,851,389 and 2,999,041. However, in these structures of prior art, no more than two geometrically regular polygonal reinforcements have been present between any two films, because of the mechanical difficulties heretofore encountered in effecting such arrangements.

Inasmuch as the strength of such films is almost entirely due to the fibers rather than the films, and the orientation of fibers will control this strength to a very high degree, it is apparent that the optimal arrangement will be constituted of a grouping of parallel fibers, in which the parallel groups form angles with each other in the order of 45°, rather than 90°, so that a substantial number of fibers will coact on pulls from directions intermediate between the longitudinal and the transverse directions of the laminates as well as in these directions.

An object of this invention is a flexible, foldable plastic film laminate of exceptional strength.

Another object is a flexible, foldable plastic film laminate in which the fibers of the reinforcement are placed in at least four different planes between the films, are substantially parallel in each of said planes and are placed substantially in four different directions between each pair of films, the angle between any two adjacent of the planes or layers being in the general order of 35° to 55°.

Another object is the method for producing such laminates.

Further objects will become apparent as the following detailed description proceeds.

Reference is being made to the drawings of which

Figure 1:
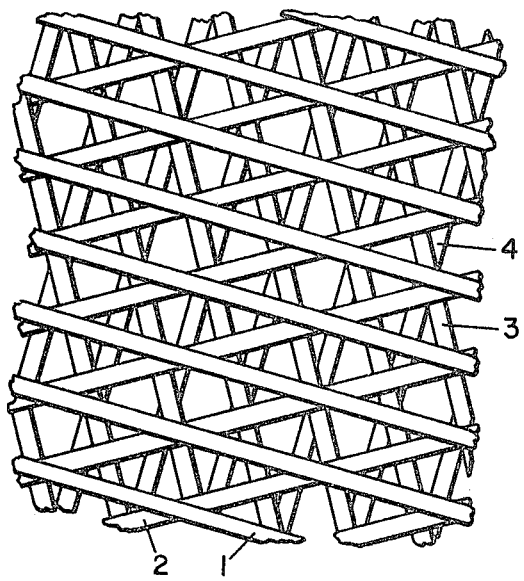
FIG. 1 and 2 are top views.
Figure 2:
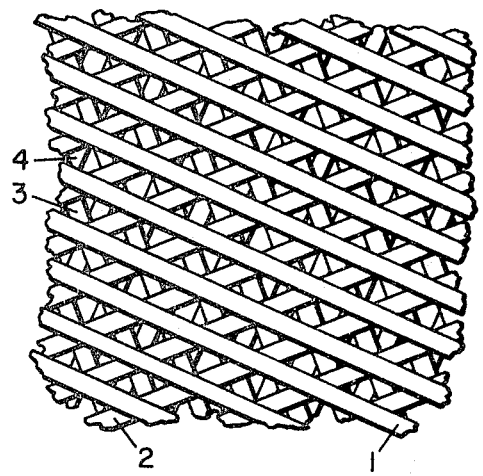
Figure 3:
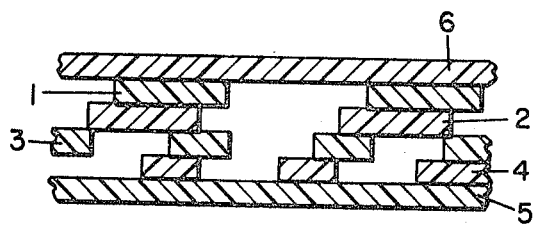
FIG. 3 is a typical cross section of the laminate, greatly enlarged.
Figure 4:
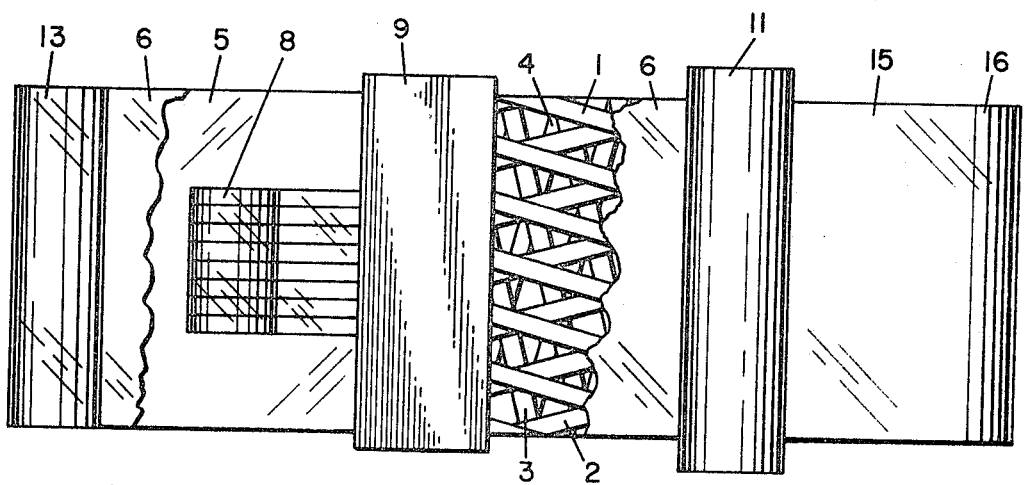
FIG. 4 is a top view of the part of the machine for making the laminate.
Figure 6:
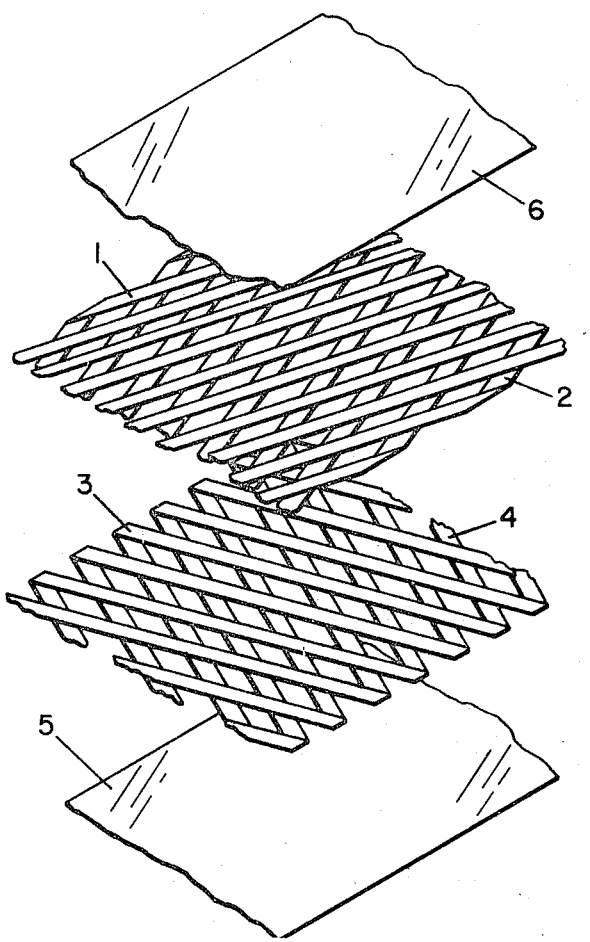
FIG. 6 is a schematic view showing the two component patterns of the film laminate of this invention separated from each other for the sake of clarity.

In accordance with my invention, I prepare, preferably by machine, but by hand layup if necessary, a fiber pattern such as shown most clearly in FIG. 6, where one pattern is a crisscross of the fibers 1 and 2 and fibers parallel with 1 and 2, at a spacing between fibers usually between one-sixteenth and 2 inches from each other and preferably one-fourth to three-forths inches from each other, in which the said fibers in each plane do not intersect but all the fibers 1 are parallel in one plane and all the fibers in the direction of fiber 2 are parallel in the other plane. This is placed automatically or by hand on top of another grate which is similar, except that the diamond pattern formed by fibers 1 and 2 has the long diagonal parallel with the machine direction of the product while the diamond pattern formed by fibers 3 and 4 has the short diagonal parallel with the machine direction, all of the these diamonds having their smaller angle between 10° and 40° and preferably between 20° and 33°. When these two diamond structures are superimposed upon each other, there results a structure such as illustrated in FIGS. 1 and 2, where fibers are positioned not about 90° divergent from each other, so as to be in a much better position to meet certain pulls or stresses from different directions. Such fiber arrangement has long been viewed as an ideal; however it has not previously been possible to make them in a practical manner.

Figure 5:
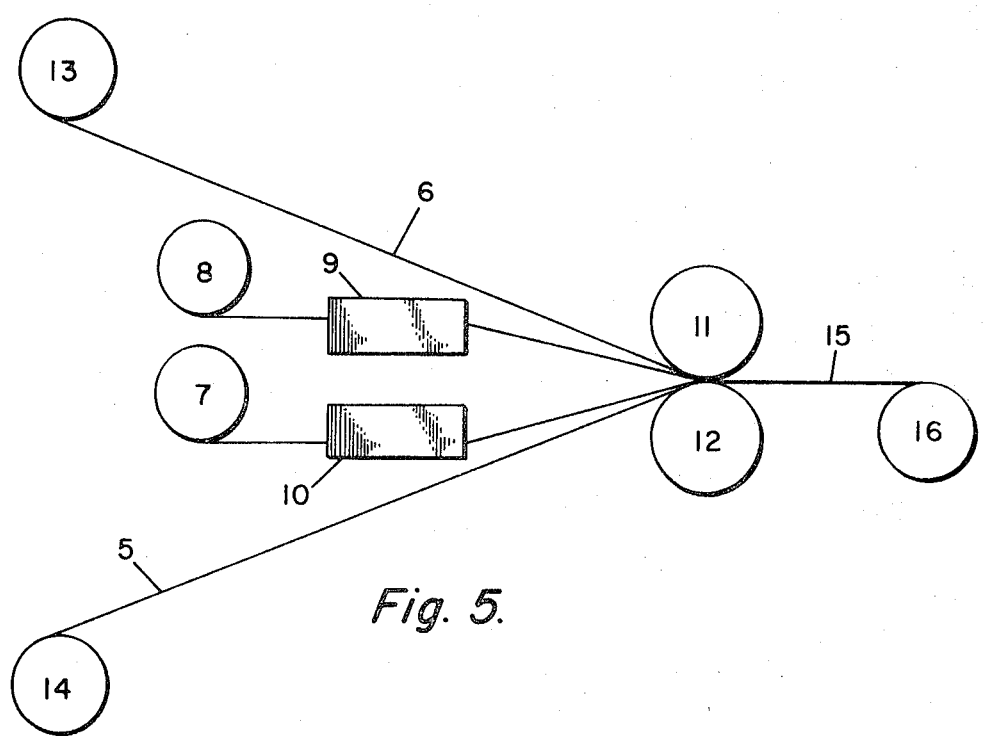
FIG. 5 is a side view of the same device.

The construction of this invention is particularly attractive, because it can be manufactured at speeds of several hundred feet per minute, utilizing existing equipment with only a very small addition, namely that of a second fiber angularizer. This arrangement is illustrated in FIG. 5. Plastic films 5 and 6, coated on one side with an adhesive and provided with antiadhesion coating on the other side so that the other side can be rolled up against the adhesive layer are passed from rollers 13 and 14 into the bite of two laminating rollers 11 and 12. Between them, also fed into the same bite of the same laminating rollers, are fiber supplies 8 and 7, which are passed through angularizers 9 and 10 which cause the said fibers to become crossed at angles, depending upon the ratio of fiber supply, speed and crossover speed in the angularizer. These ratios are set so as to produce fibers crossing each other to form a diamond pattern, in which the small angle is between 10° and 40° and preferably between 20° and 35°. The antiadhesion coating can be dispensed with if the film is laminated immediately following the application of the adhesive. The adhesive can be dispensed with if the fibers are held in a heat sealing or extrusion union of the films being laminated. In the term lamination, I include the process of forming a union of two films by extruding or casting one of the films onto the other. The layers and/or the films may be multiple, but at least two sets of crossed fibers forming two diamond patterns are essential.

These diamond patterns then become superimposed over each other and laminated between the said adhesives. From the laminating roller, the result laminate 15 passes on to the receiving roll 16.

The angularizer can be of any construction known in the art. It is not part of this invention. I may employ for example the angularizer disclosed in U.S. Pat. No. 3,156,027 or it may be based on a reciprocating comb which lays down the fibers in a crisscross as it passes reciprocatingly across a tenter frame type of arrangement, or it may be a revolving creel with fiber guides carried through eyelets on a chain revolving around a carrier medium such as a film of polyvinyl alcohol which is subsequently dissolved in water, leaving the fibers in the diamond pattern desired.

Any of these arrangements are satisfactory and usable so far as this invention is concerned.

As for the films, I can employ any flexible, foldable plastic film of adequate strength, and the same applies to the fibers. For example, these may be of polyolefins, including polyethylene, polypropylene, and their copolymers, of cellulosic materials, natural or synthetic, polyvinyl halide including the chloride and the fluoride, polydiethylene glycol terephthalates and other polyesters of fibrous nature, and polyvinylidine halides, polycarbonates, polyoxyphenols, nylon-type polyamides, including also such fibers and films of properties similar to those mentioned, which have not yet been invented, but may be appearing on the market at some future time during the validity of any patent or continuation thereof.

The adhesive can be any type of industrial adhesive that holds together the fibers and the films discussed, including for example, natural and synthetic rubber glues, hot melt composition of cellulose esters and ethers, polyvinyl acetal, polyamides and polyethylenes of molecular weight sufficiently low to ensure tackiness, copolymer of ethyl acrylate and polyacetate, and the like. Since formulations of adhesives are well known in the art and disclosed in the patents cited above, it is believed superfluous here to discuss this noncritical factor in detail.

It is thus seen that the present invention is broad in scope and is not to be restricted by the specific examples here given but construed as broadly as is consistent with the prior art and the claims.

Having thus disclosed my invention, I claim:

1. A multidirectional fiber reinforced laminate which is flexible and foldable and which contains at least four separate layers of reinforcing fibers disposed between a pair of plastic films, said laminate having a machine direction and a cross-direction, the fibers in each layer being substantially parallel with each other, characterized by:

the fibers in the first layer being disposed at an angle to those in the second layer so that the fibers of the first and second layers form diamond patterns, each of the diamonds of said pattern having four edges, two opposite edges being defined by two fibers of said first layer and the other two opposite edges being defined by two fibers of said second layer, each of said diamonds having two acute angled corners and two obtuse angled corners defined by said edges and having a long axis extending between said acute angled corners and a short axis extending between said obtuse angled corners, the fibers in the third layer being disposed at an angle to those in the fourth layer so that the fibers of the third and fourth layers form diamond patterns, each of the diamonds of said pattern having four edges, two opposite edges being defined by two fibers of said third layer and the other two opposite edges being defined by two fibers of said third layer and the other two opposite edges being defined by two fibers of said fourth layer, each of said diamonds having two acute angled corners and two obtuse angled corners defined by said edges and having a long axis extending between said acute angled corners and a short axis extending between said obtuse angled corners, the long axes of the diamonds in the diamond pattern of the first and second layers extending substantially in the machine direction, and the long axes of the diamonds in the diamond pattern of the third and fourth layers extending substantially in the cross-direction, so that none of the fibers extend substantially in either the machine direction or the cross-direction.

2. The laminate of claim 1 wherein the acute angles of the diamonds in one of said diamond patterns are from 10° to 40°.

3. The laminate of claim 1 wherein the acute angles of the diamonds in both of said diamond patterns are from 10° to 40°.

4. The laminate of claim 1 wherein the acute angles of the diamonds in one of said diamond patterns are between 20° and 33°.

5. The laminate of claim 1 wherein the acute angles of the diamonds in both of said diamond patterns are between 20° and 33°.

6. The method of manufacturing a multidirectional fiber reinforced laminate which is flexible and foldable and which contains at least four separate layers of reinforcing fibers disposed between a pair of plastic films, said laminate having a machine direction and a cross-direction, the fibers in each layer being substantially parallel with each other, which comprises the steps of:

supplying to a laminator two plastic fiber webs, and, between said webs, a first layer of substantially parallel fibers, and, a second layer of substantially parallel fibers, and, a third layer of substantially parallel fibers, and, a fourth layer of substantially parallel fibers, the fibers in the first layer being disposed at an angle to those in the second layer so that the fibers of the first and second layers form diamond patterns, each of the diamonds of said pattern having four edges, two opposite edges being defined by two fibers of said first layer and the other two opposite edges being defined by two fibers of said second layer, each of said diamonds having two acute angled corners and two obtuse angled corners defined by said edges and having a long axis extending between said acute angled corners and a short axis extending between said obtuse angled corners, the fibers in the third layer being disposed at an angle to those in the fourth layer so that the fibers of the third and fourth layers form diamond patterns, each of the diamonds of said pattern having four edges, two opposite edges being defined by two fibers of said third layer and the other two opposite edges being defined by two fibers of said fourth layer, each of said diamonds having two acute angled corners and two obtuse angled corners defined by said edges and having a long axis extending between said acute angled corners and a short axis extending between said obtuse corners, the long axes of the diamonds in the diamond pattern of the third and fourth layers extending substantially in the corss-direction, so that none of the fibers extend substantially in either the machine direction or the cross-direction, and laminating said webs and layers together.

7. The method of claim 6 wherein the acute angles of the diamonds in one of said diamond patterns are from 10° to 40°.

8. The method of claim 6 wherein the acute angles of the diamonds in both of said diamond patterns are from 10° to 40°.

9. The method of claim 6 wherein the acute angles of the diamonds in one of said diamond patterns are between 20° and 33°.

10. The method of claim 6 wherein the acute angles of the diamonds in both of said diamond patterns are between 20° and 33°.

* * * * *